United States Patent
Wong et al.

(10) Patent No.: US 10,142,985 B2
(45) Date of Patent: Nov. 27, 2018

(54) OPPORTUNISTIC SECONDARY CHANNEL ACCESS

(71) Applicant: Apple Inc., Cupertino, CA (US)

(72) Inventors: Chiu Ngok E. Wong, San Jose, CA (US); Joonsuk Kim, Saratoga, CA (US); Christiaan A. Hartman, San Jose, CA (US); Guoqing Li, Cupertino, CA (US); Su Khiong Yong, Palo Alto, CA (US); Yong Liu, Campbell, CA (US)

(73) Assignee: Apple Inc., Cupertino, CA (US)

( * ) Notice: Subject to any disclaimer, the term of this patent is extended or adjusted under 35 U.S.C. 154(b) by 167 days.

(21) Appl. No.: 15/099,859

(22) Filed: Apr. 15, 2016

(65) Prior Publication Data
US 2016/0316470 A1    Oct. 27, 2016

Related U.S. Application Data

(60) Provisional application No. 62/150,341, filed on Apr. 21, 2015.

(51) Int. Cl.
*H04W 72/04* (2009.01)
*H04W 76/38* (2018.01)
(Continued)

(52) U.S. Cl.
CPC ..... *H04W 72/0446* (2013.01); *H04L 27/0006* (2013.01); *H04W 16/14* (2013.01);
(Continued)

(58) Field of Classification Search
CPC .......... H04W 72/0446; H04W 76/068; H04W 72/0453; H04W 16/14; H04W 84/12; H04L 27/0006
See application file for complete search history.

(56) References Cited

U.S. PATENT DOCUMENTS 8,213,867 B2   7/2012   Zhang et al.
8,395,997 B2   3/2013   Banerjea et al.
(Continued)

FOREIGN PATENT DOCUMENTS

EP    2863696         4/2015
WO    2014014084      1/2014
WO    WO2015134004 A1   9/2015

OTHER PUBLICATIONS

Extended European Search Report for European Patent Application No. 16165988.3, dated Aug. 11, 2016, pp. 1-9.

*Primary Examiner* — Charles C Jiang
*Assistant Examiner* — Saad Khawar
(74) *Attorney, Agent, or Firm* — Meyertons Hood Kivlin Kowert & Goetzel, P.C.; Jeffrey C. Hood; Matthew C. Washburn

(57) ABSTRACT

In embodiments, a wireless device, such as a Wi-Fi device, transmits communication signals on secondary channels within an operational bandwidth of a wireless network, concurrent with a transmission from another wireless device on a primary channel. The wireless device may detect that a first frequency band within an operating bandwidth of a wireless network is occupied by a first transmission transmitted by a second wireless device, and determine that a second, different frequency band within the operating bandwidth of the wireless network is not occupied. In response, the wireless device may transmit a second transmission occupying the second frequency band concurrent with the first transmission. The wireless device may set a duration of the second transmission based at least in part on a determination of whether the second wireless device is configured to assess the state of all frequency bands within the operating bandwidth before beginning a subsequent transmission.

19 Claims, 9 Drawing Sheets

(51) Int. Cl.
  *H04W 16/14*   (2009.01)
  *H04L 27/00*   (2006.01)
  *H04W 84/12*   (2009.01)

(52) U.S. Cl.
  CPC ....... *H04W 72/0453* (2013.01); *H04W 76/38* (2018.02); *H04W 84/12* (2013.01)

(56) References Cited

U.S. PATENT DOCUMENTS

| | | | |
|---|---|---|---|
| 8,619,805 B2 | 12/2013 | Flammer, III | |
| 2008/0112380 A1 | 5/2008 | Fischer | |
| 2014/0328195 A1* | 11/2014 | Sampath | H04W 72/082 370/252 |
| 2014/0328268 A1* | 11/2014 | Zhu | H04W 74/002 370/329 |
| 2015/0341954 A1* | 11/2015 | Li | H04W 74/08 370/392 |
| 2016/0105535 A1* | 4/2016 | Kenney | H04L 5/00 370/329 |
| 2017/0223731 A1* | 8/2017 | Lee | H04W 74/002 |

* cited by examiner

OPPORTUNISTIC SECONDARY CHANNEL ACCESS

RELATED APPLICATIONS

This application claims priority to U.S. provisional patent application Ser. No. 62/150,341, entitled "Opportunistic Secondary Channel Access," by Chiu Ngok E. Wong, et al., filed Apr. 21, 2015, which is hereby incorporated by reference in its entirety as though fully and completely set forth herein.

FIELD

The present application relates to wireless communications, including techniques for wireless communication among mobile stations in a wireless networking system.

DESCRIPTION OF THE RELATED ART

Wireless communication systems are rapidly growing in usage. Further, wireless communication technology has evolved from voice-only communications to also include the transmission of data, such as Internet and multimedia content. A popular short/intermediate range wireless communication standard is wireless local area network (WLAN). Most modern WLANs are based on the IEEE 802.11 standard (or 802.11, for short) and are marketed under the Wi-Fi brand name. WLAN networks link one or more devices to a wireless access point, which in turn provides connectivity to the wider area Internet.

In 802.11 systems, devices that wirelessly connect to each other are referred to as "stations", "mobile stations", "user devices" or STA or UE for short. Wireless stations can be either wireless access points or wireless clients (or mobile stations). Access points (APs), which are also referred to as wireless routers, act as base stations for the wireless network. APs transmit and receive radio frequency signals for communication with wireless client devices. APs can also typically couple to the Internet in a wired fashion. Wireless clients operating on an 802.11 network can be any of various devices such as laptops, tablet devices, smart phones, or fixed devices such as desktop computers. Wireless client devices are referred to herein as user equipment (or UE for short). Some wireless client devices are also collectively referred to herein as mobile devices or mobile stations (although, as noted above, wireless client devices overall may be stationary devices as well).

In some prior art systems, Wi-Fi mobile stations are able to communicate using channels of various bandwidths. However, improvements in the operation of such devices are desired, such as in coordination of bandwidth usage.

SUMMARY

Embodiments described herein relate to devices and methods for utilizing available secondary channels within a wireless network, using a backoff procedure.

Some embodiments relate to a mobile device that includes a radio configured to perform wireless communications within a wireless network, and at least one processor coupled to the radio. The processor may be configured to cause the mobile device to detect, via the radio, a first transmission occupying a first frequency band within an operating bandwidth of the wireless network. The first transmission may be transmitted by a remote wireless device. The processor may be further configured to cause the mobile device to, in response to determining that the first transmission does not occupy a second, different frequency band within the operating bandwidth of the wireless network, transmit, via the radio, a second transmission occupying the second frequency band concurrent with the first transmission. The processor may be further configured to cause the mobile device to determine whether the remote wireless device is configured to assess the state of all frequency bands within the operating bandwidth before beginning a subsequent transmission. The processor may be further configured to cause the mobile device to set a duration of the second transmission based at least in part on whether the remote wireless device is configured to assess the state of all frequency bands within the operating bandwidth before beginning a subsequent transmission.

In some embodiments, setting the duration of the second transmission may include determining determine an expected end time of the first transmission; and in response to determining that the remote wireless device is not configured to assess the state of all frequency bands within the operating bandwidth before beginning a subsequent transmission, setting the duration of the second transmission such that the second transmission will terminate not later than the expected end time of the first transmission.

In some embodiments, setting the duration of the second transmission may include, in response to determining that the remote wireless device is configured to assess the state of all frequency bands within the operating bandwidth before beginning a subsequent transmission, setting the duration of the second transmission without regard to the expected end time of the first transmission.

In some embodiments, setting the duration of the second transmission may include detecting that the first transmission is occurring during a time window defined for transmission by the remote wireless device; and setting the duration of the second transmission such that the second transmission will terminate not later than an end of the time window.

In some embodiments, the processor may be further configured to cause the mobile device to determine whether the remote wireless device comprises an IEEE 802.11 legacy wireless device. In response to determining that the remote wireless device comprises an IEEE 802.11 legacy wireless device, the mobile device may set the duration of the second transmission such that the second transmission will terminate not later than completion of the first transmission. In response to determining that the remote wireless device does not comprise an IEEE 802.11 legacy wireless device, the mobile device may set the duration of the second transmission without regard to completion of the first transmission.

In some embodiments, the processor may be further configured to cause the mobile device to, in response to the determining that the remote wireless device does not comprise an IEEE 802.11 legacy wireless device, and further in response to determining that the first transmission is occurring during a time window defined for transmission by the remote wireless device, set the duration of the second transmission such that the second transmission will terminate not later than an end of the time window.

In some embodiments, the processor may be further configured to cause the mobile device to maintain a plurality of backoff counters for a respective plurality of frequency bands within the operating bandwidth of the wireless network. The plurality of backoff counters may comprise a first backoff counter for the first frequency band and a second backoff counter for the second frequency band. Transmitting the second transmission may be in response to determining that the second backoff counter has expired and the first backoff counter has not expired.

In some embodiments, the processor may be further configured to cause the mobile device to determine that the remote wireless device belongs to a different basic service set (BSS) than the mobile device, wherein transmitting the second transmission is further in response to the determining that the remote wireless device belongs to a different BSS.

Some embodiments relate to a non-transitory computer-readable medium storing software instructions executable by a processor of a first wireless device to cause the first wireless device to perform steps similar to those defined for the mobile device above.

Some embodiments relate to a method for communicating within a wireless network, executed by a first wireless device. The method may comprise detecting a first transmission by a second wireless device during a time window defined for transmission by the second wireless device, the first transmission occupying a first frequency band within an operating bandwidth of the wireless network. In response to determining that the first transmission does not occupy a second, different frequency band within the operating bandwidth of the wireless network, the first wireless device may transmit a second transmission occupying the second frequency band concurrent with the first transmission. The first wireless device may set a duration of the second transmission such that the second transmission will terminate not later than an end of the time window.

In some embodiments, the first wireless device may set the duration of the second transmission without regard to an end time of the first transmission.

In some embodiments, the first wireless device may maintain a plurality of backoff counters for a respective plurality of frequency bands within the operating bandwidth of the wireless network, wherein the plurality of backoff counters comprises a first backoff counter for the second frequency band. Transmitting the second transmission may be in response to determining that the first backoff counter has expired.

In some embodiments, the first wireless device may determine that the second wireless device belongs to a different basic service set (BSS) than the first wireless device. Transmitting the second transmission may be further in response to the determining that the second wireless device belongs to a different BSS.

In some embodiments, a wireless device, such as a Wi-Fi device, transmits communication signals on one or more secondary channels within an operational bandwidth of a wireless network, concurrent with a transmission from another wireless device on a primary channel. Embodiments of the disclosure provide methods and apparatuses for utilizing the secondary channels without conflicting with the transmission on the primary channel, while maintaining backward compatibility with legacy wireless systems.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
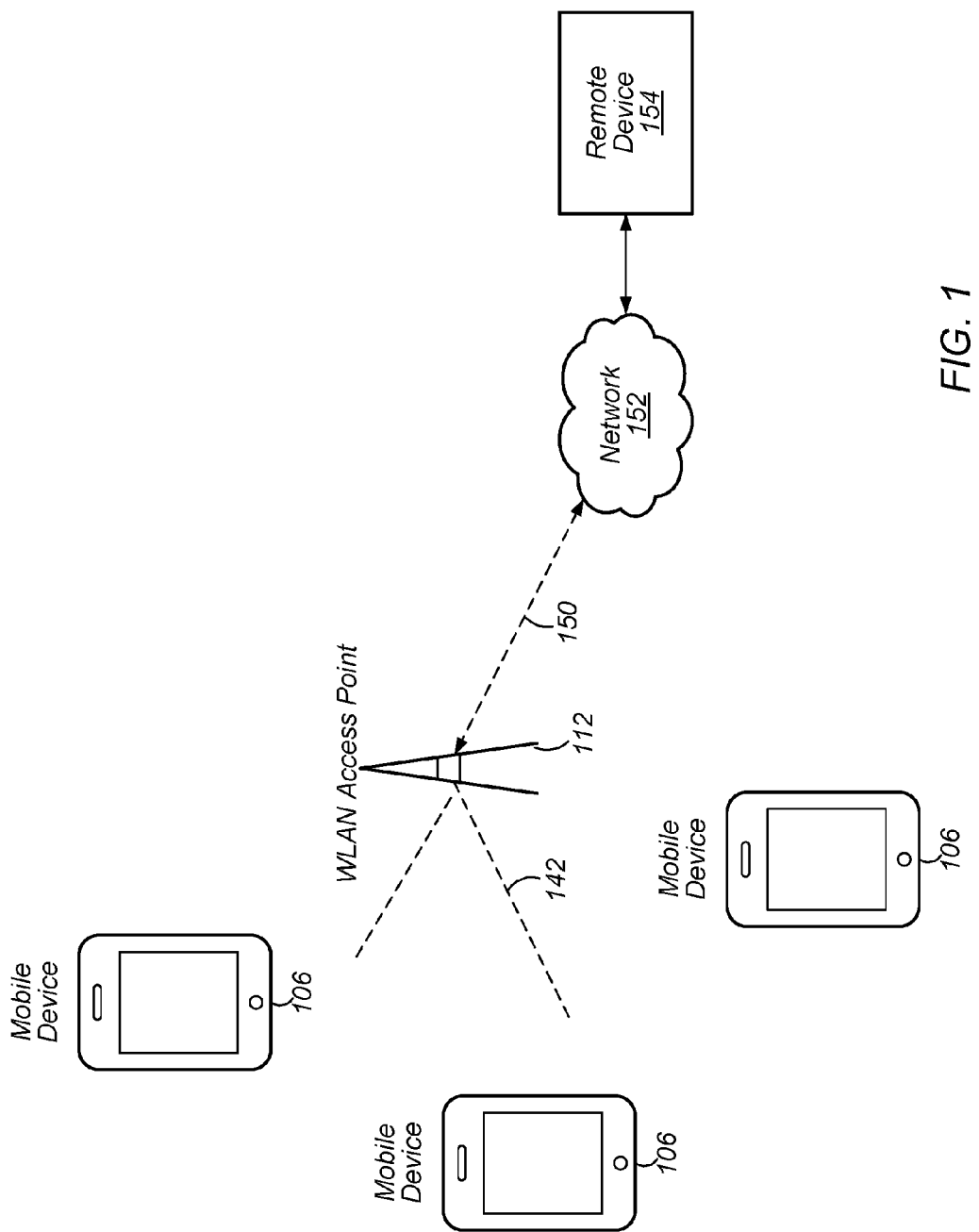
FIG. 1 illustrates an example WLAN communication system, according to some embodiments.

Additional figures included in the appended slide deck further illustrate various features according to embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present application. Definitions of the most prominently used acronyms that may appear throughout the present application are provided below:

AP: Access Point
BS: Base Station
BSS: Basic Service Set
BSSID: Basic Service Set Identifier
CCA: Clear Channel Assessment
DIFS: Distributed Interframe Space
DL: Downlink (from BS to UE)
EDCA: Enhanced Distributed Channel Access
LAN: Local Area Network
OBSS: Overlapping Basic Service Set
PCF: Point Coordination Function
PIFS: PCF Interframe Space
PLCP: PHY Layer Convergence Procedure
PPDU: PLCP Protocol Data Unit
RAT: Radio Access Technology
RX: Reception/Receive TX: Transmission/Transmit
TXOP: Transmit Opportunity
UE: User Equipment
UL: Uplink (from UE to BS)
WLAN: Wireless LAN Terminology The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Mobile Device (or Mobile Station)—any of various types of computer systems devices which are mobile or portable and which performs wireless communications using WLAN communication. Examples of mobile devices include mobile telephones or smart phones (e.g., iPhone™, Android™-based phones), and tablet computers such as iPad™ Samsung Galaxy™, etc. Various other types of devices would fall into this category if they include Wi-Fi or both cellular and Wi-Fi communication capabilities, such as laptop computers (e.g., MacBook™), portable gaming devices (e.g., Nintendo DS™, Play Station Portable™, Gameboy Advance™, iPhone™), portable Internet devices, and other handheld devices, as well as wearable devices such as smart watches, smart glasses, headphones, pendants, earpieces, etc. In general, the term "mobile device" can be broadly defined to encompass any electronic, computing, and/or telecommunications device (or combination of devices) which is easily transported by a user and capable of wireless communication using WLAN or Wi-Fi.

Wireless Device—any of various types of computer systems devices which performs wireless communications using WLAN communications. As used herein, the term "wireless device" may refer to a mobile device, as defined above, or to a stationary device, such as a stationary wireless client or a wireless base station. For example a wireless device may be any type of wireless station of an 802.11 system, such as an access point (AP) or a client station (STA or UE).

WLAN—The term "WLAN" has the full breadth of its ordinary meaning, and at least includes a wireless communication network or RAT that is serviced by WLAN access points and which provides connectivity through these access points to the Internet. Most modern WLANs are based on IEEE 802.11 standards and are marketed under the name "Wi-Fi". A WLAN network is different from a cellular network.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

FIG. 1—WLAN System

FIG. 1 illustrates an example WLAN system according to some embodiments. As shown, the exemplary WLAN system includes one or more wireless client stations or mobile devices, or user equipment (UEs), 106 that are configured to communicate over a wireless communication channel 142 with an Access Point (AP) 112. The AP 112 may be a Wi-Fi access point. The AP 112 may communicate via a wired or wireless communication channel 150 with one or more other electronic devices (not shown) and/or another network 152, such as the Internet. Additional electronic devices, such as the remote device 154, may communicate with components of the WLAN system via the network 152. For example, the remote device 154 may be another wireless client station. The WLAN system may be configured to operate according to any of various communications standards, such as the various IEEE 802.11 standards. In some embodiments, at least one mobile device 106 may be configured to communicate directly with one or more neighboring mobile devices (e.g., another mobile device 106), without use of the access point 112.

One or more mobile device 106 and/or the AP 112 may be configured to utilize available secondary channels, using a backoff procedure, as disclosed in more detail below.

Figure 2:
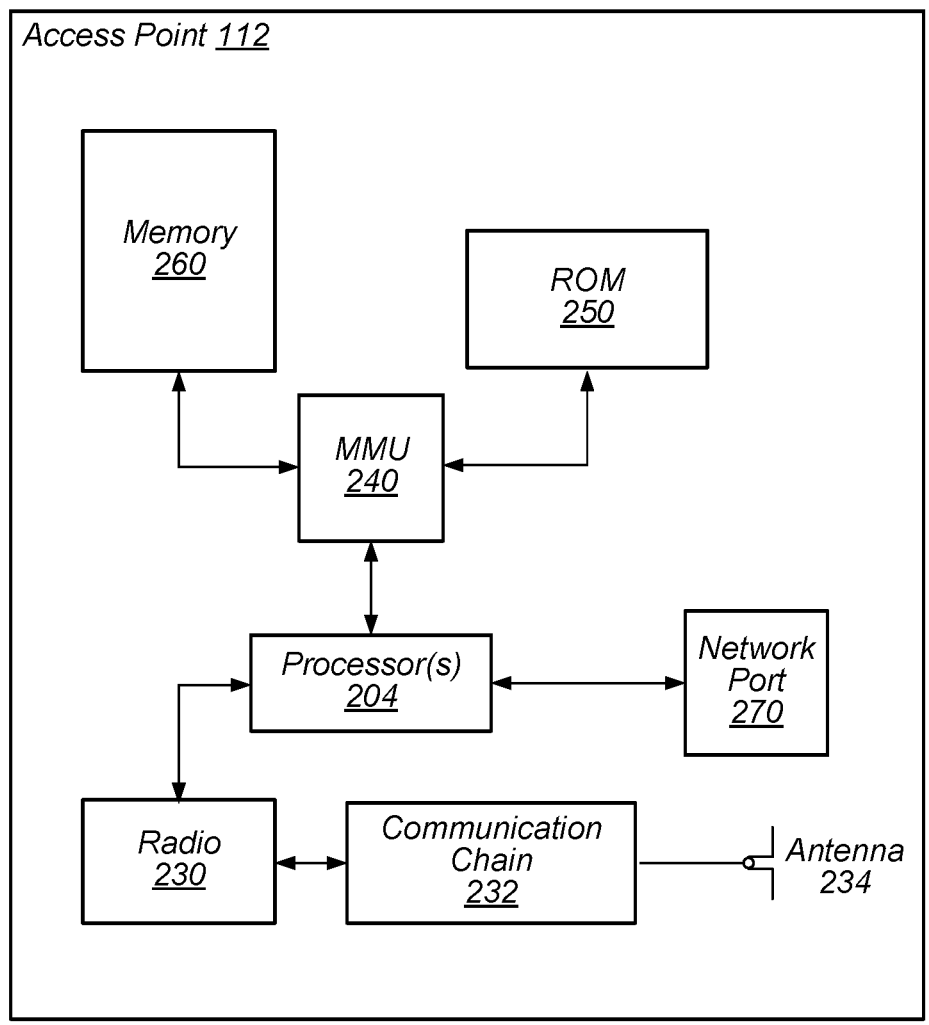
FIG. 2 illustrates an example simplified block diagram of a WLAN Access Point (AP), according to some embodiments.

FIG. 2—Access Point Block Diagram

FIG. 2 illustrates an exemplary block diagram of an access point (AP) 112. It is noted that the block diagram of the AP of FIG. 2 is merely one example of a possible system. As shown, the AP 112 may include processor(s) 204 which may execute program instructions for the AP 112. The processor(s) 204 may also be coupled to memory management unit (MMU) 240, which may be configured to receive addresses from the processor(s) 204 and translate those addresses to locations in memory (e.g., memory 260 and read only memory (ROM) 250) or to other circuits or devices.

The AP 112 may include at least one network port 270. The network port 270 may be configured to couple to a wired network and provide a plurality of devices, such as mobile devices 106, access to the Internet. For example, the network port 270 (or an additional network port) may be configured to couple to a local network, such as a home network or an enterprise network. For example, network port 270 may be an Ethernet port. The local network may provide connectivity to additional networks, such as the Internet.

The AP 112 may include at least one antenna 234. The at least one antenna 234 may be configured to operate as a wireless transceiver and may be further configured to communicate with mobile device 106 via wireless communication circuitry (or radio) 230. The antenna 234 communicates with the wireless communication circuitry 230 via communication chain 232. Communication chain 232 may include one or more receive chains, one or more transmit chains, or both. The wireless communication circuitry 230 may be configured to communicate via Wi-Fi or WLAN, e.g., 802.11. Any 802.11 protocol may be used, including 802.11a, b, g, n, ac, and ax. The wireless communication circuitry 230 may also, or alternatively, be configured to communicate via various other wireless communication technologies, including, but not limited to, Long-Term Evolution (LTE), LTE Advanced (LTE-A), Global System for Mobile (GSM), Wideband Code Division Multiple Access (WCDMA), CDMA2000, etc., for example when the AP is co-located with a base station in case of a small cell, or in other instances when it may be desirable for the AP 112 to communicate via various different wireless communication technologies.

The AP 112 may be configured to utilize available secondary channels, using a backoff procedure, as disclosed in more detail below.

Figure 3:
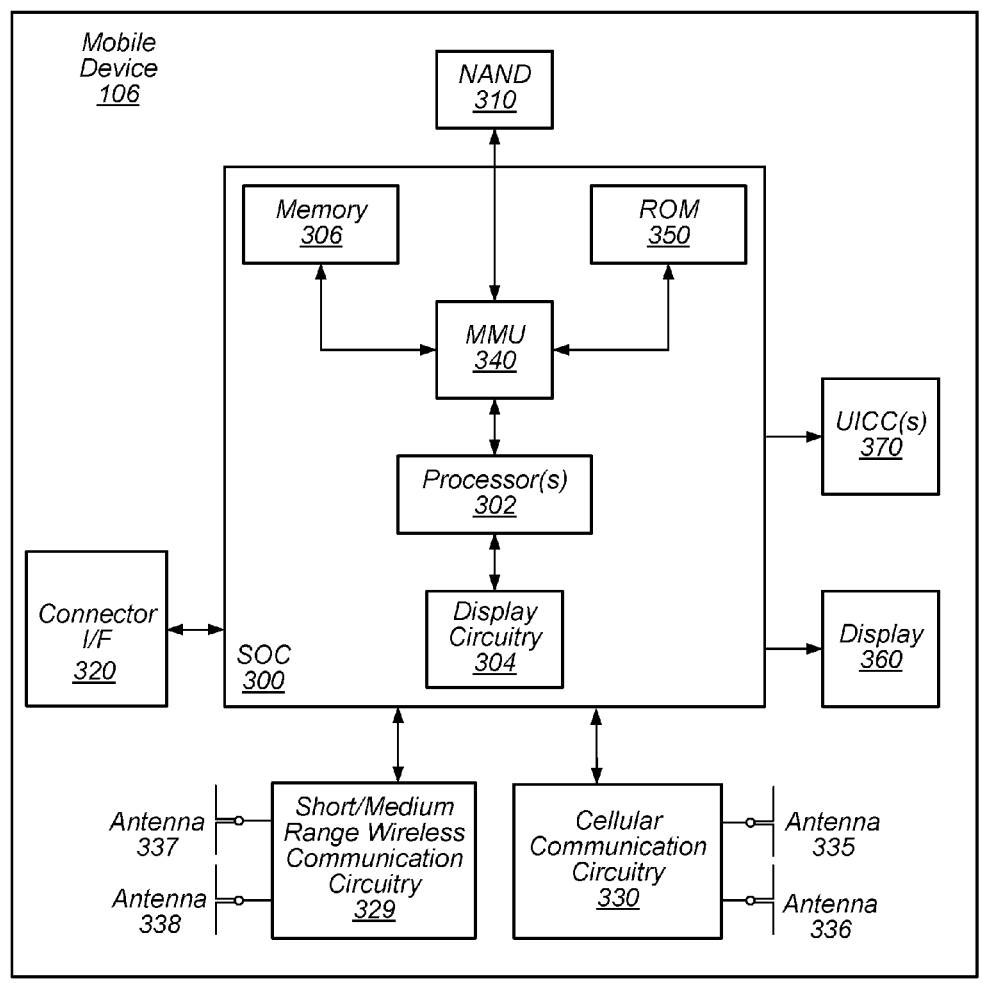
FIG. 3 illustrates an example simplified block diagram of a mobile device, according to some embodiments.

FIG. 3—Mobile Device Block Diagram

FIG. 3 illustrates an example simplified block diagram of a mobile device 106. As shown, the mobile device 106 may include a system on chip (SOC) 300, which may include portions for various purposes. The SOC 300 may be coupled to various other circuits of the mobile device 106. For example, the mobile device 106 may include various types of memory (e.g., including NAND flash 310), a connector interface (or dock) 320 (e.g., for coupling to a computer system, dock, charging station, etc.), a display 360, cellular communication circuitry 330 such as for LTE, GSM, etc., and short to medium range wireless communication circuitry 329 (e.g., Bluetooth™ and WLAN circuitry). The mobile device 106 may further include one or more smart cards that include SIM (Subscriber Identity Module) functionality, such as one or more UICC(s) (Universal Integrated Circuit Card(s)) 370. The cellular communication circuitry 330 may couple to one or more antennas, such as antennas 335 and 336 as shown. The short to medium range wireless communication circuitry 329 may also couple to one or more antennas, such as antennas 337 and 338 as shown. Alternatively, the short to medium range wireless communication circuitry 329 may couple to the antennas 335 and 336 in addition to, or instead of, coupling to the antennas 337 and 338. The short to medium range wireless communication circuitry 329 may include multiple receive chains and/or multiple transmit chains for receiving and/or transmitting multiple spatial streams, such as in a multiple-input multiple output (MIMO) configuration.

As shown, the SOC 300 may include processor(s) 302 which may execute program instructions for the mobile device 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, cellular communication circuitry 330, short range wireless communication circuitry 329, connector interface (I/F) 320, and/or display 360. The MMU 340 may be configured to perform memory protection and page table translation or set up. In some embodiments, the MMU 340 may be included as a portion of the processor(s) 302.

As noted above, the mobile device 106 may be configured to communicate wirelessly directly with one or more neighboring mobile devices. The mobile device 106 may be configured to communicate according to a WLAN RAT for communication in a WLAN network, such as that shown in FIG. 1.

As described herein, the mobile device 106 may include hardware and software components for implementing the features described herein. For example, the processor 302 of the mobile device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE 106, in conjunction with one or more of the other components 300, 304, 306, 310, 320, 330, 335, 340, 350, 360, 370 may be configured to implement part or all of the features described herein.

The mobile device 106 may be configured to utilize available secondary channels, using a backoff procedure, as disclosed in more detail below.

Wi-Fi Channelization

In some embodiments, wireless devices (e.g., mobile device 106) may be able to communicate using various channel bandwidths. For example, IEEE 802.11n supports 20 MHz and 40 MHz channel bandwidths by combining two 20 MHz channels. Similarly, 802.11ac supports 20 MHz, 40 MHz, 80 MHz, and 160 MHz channel bandwidths by combining the appropriate number of 20 MHz channels. For each channel bandwidth, one of the component 20 MHz channels may be designated as a primary channel. For example, according to 802.11ac, a BSS operating at primary channel 60 shall send a PHY Layer Convergence Procedure (PLCP) protocol data unit (PPDU) of 20 MHz in channel 60; a PPDU of 40 MHz in channels 60 and 46; a PPDU of 80 MHz in channels 52, 56, 60, and 64; and a PPDU of 160 MHz in channels 36, 40, 44, 48, 52, 56, 60, and 64.

Using a common primary channel allows wireless devices sending PPDUs of different bandwidths to synchronize with each other regarding the state of the medium, thus avoiding the problem of hidden terminals. For example, any wireless device seeking to use primary channel 60 may determine whether any other wireless device is using the channel, regardless of bandwidth, by monitoring the primary channel 60.

However, the above approach may cause inefficiency in the overall spectrum usage. For example, if two APs are operating with a common primary channel (e.g., channel 60) while supporting a wide-bandwidth (e.g., 80 MHz), then an ongoing transmission to or from either AP may prevent the other AP from accessing the medium, even if the current transmission is not using the entire bandwidth (e.g., if the current transmission consists of only a 20 MHz PPDU on channel 60). In such a circumstance, the unused portion of the bandwidth (e.g., secondary channels 52, 56, and 64) is therefore wasted.

Alternatively, wireless devices may be configured to opportunistically access secondary channels. To avoid the problem of hidden terminals while allowing access to secondary channels, each wireless device may comply with backoff procedures and channel access rules for secondary channels, as discussed below.

Backoff Procedure with Clear Channel Assessment Per Channel Bandwidth

Backoff procedures are steps taken by a wireless device to contend for transmission on the medium. Such backoff procedures may include the wireless device conducting a clear channel assessment (CCA) to determine whether the medium is idle before transmitting on the medium. If the CCA indicates that the medium is not idle, the wireless device may wait until the medium is idle, allow the distributed interframe space (DIFS) or the point coordination function (PCF) interframe space (PIFS) to elapse, and then attempt retransmission. As part of the retransmission, the wireless device may select a random number to use as a backoff counter (e.g., an enhanced distributed channel access {EDCA} backoff counter). The backoff counter is decremented each timeslot, as long as the medium remains idle, but the backoff is frozen while the medium is busy. The wireless device may transmit when the backoff counter expires (e.g., reaches 0).

Current 802.11 standards define specific rules for performing the CCA. For example, according to 802.11ac, the CCA is required only to assess the channels on which the wireless device intends to transmit. Specifically, before transmitting a 20 MHz frame, the CCA requires assessment of only the primary 20 MHz channel; before transmitting a 40 MHz frame, the CCA requires assessment of only the primary 20 MHz channel and the sole secondary 20 MHz channel; before transmitting an 80 MHz frame, the CCA requires assessment of only the primary 20 MHz channel and the three secondary 20 MHz channels; and before transmitting a 160 MHz frame, all eight 20 MHz channels must be assessed. However, some legacy systems (e.g., 802.11a systems), which may not support wide bandwidths, may assess only the primary 20 MHz channel before transmitting. Thus, current 802.11 standards have followed the practice of requiring a common primary channel in order to maintain backward compatibility with such legacy systems.

To allow opportunistic access of secondary channels, while still maintaining backward compatibility, new backoff procedures may be implemented. An operating bandwidth W may be divided into N frequency bands (e.g., equal-size frequency bands). For example, in an 802.11 environment, the operating bandwidth may be divided into N channels, each channel having a 20 MHz bandwidth. In some embodiments, a wireless device may maintain separate backoff counters for each frequency band. For example, in an 802.11 environment where W=80 MHz and N=4, a wireless device may maintain 4 independent backoff counters. A wireless device may thus consider the availability of each frequency band independently, as the backoff counter for the respective frequency band decrements to 0.

Figure 4:
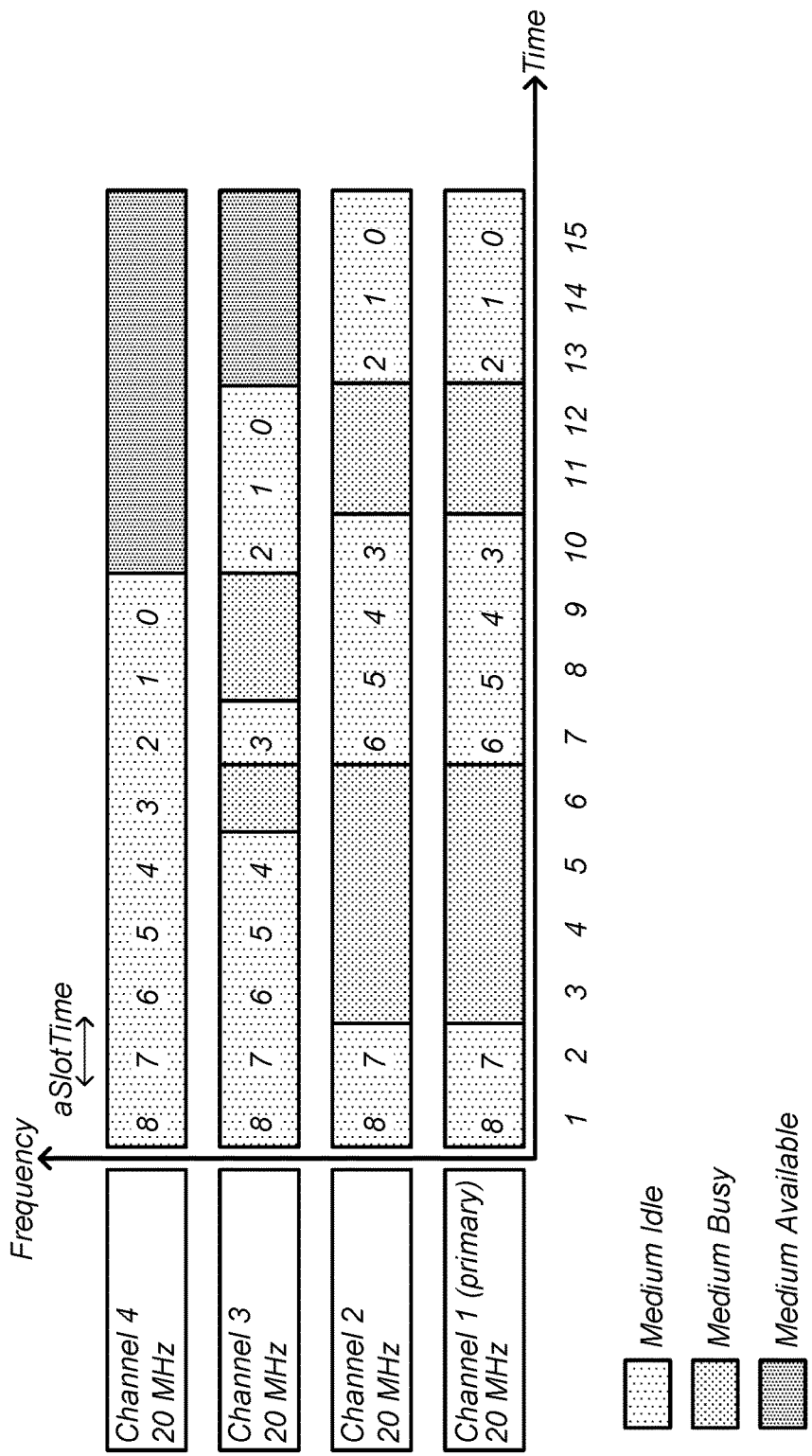
FIG. 4 illustrates an example signal flow of a backoff procedure with a clear channel assessment for each channel bandwidth, according to some embodiments.

FIG. 4 illustrates an example signal flow of a backoff procedure with a clear channel assessment for each channel bandwidth, where W=80 MHz and N=4, according to some embodiments. In this example, the backoff counters are initially set to a (e.g., randomly selected) value of 8. In time slots 1 and 2, all four channels are idle, so all four backoff counters are decremented. However, in timeslots 3, 4, and 5, channels 1 (the primary channel) and 2 are busy. Thus, the backoff counters for those channels are not decremented. However, channels 3 and 4 remain idle, so the backoff counters for channels 3 and 4 are decremented. In timeslot 6, channels 1-3 are busy, while only channel 4 remains idle. Thus, only the backoff counter for channel 4 is decremented. In timeslot 7, all channels are idle, so all backoff counters are decremented. In timeslots 8 and 9, channel 3 is busy, while the other channels remain idle, so the backoff counters for channels 1, 2, and 4 are decremented.

In timeslot 9 the backoff counter for channel 4 reaches 0. Thus in timeslot 10, the wireless device is free to transmit on channel 4. Because the backoff counters for channels 1-3 have not reached 0, the wireless device may not yet transmit on those channels. Thus, the transmission in timeslot 10 is limited to a bandwidth of 20 MHz (i.e., the bandwidth of channel 4). The backoff counters for channels 1-3 are decremented in timeslot 10 because channels 1-3 are idle. In timeslots 11-12, channels 1-2 are busy, while channel 3 remains idle. Thus, only the backoff counter for channel 3 is decremented. The wireless device continues to transmit on channel 4.

In timeslot 12, the backoff counter for channel 3 reaches 0. Thus in timeslot 13, the wireless device is free to transmit on channel 3. Thus, the wireless device may expand the bandwidth of its transmission to 40 MHz (i.e., the combined bandwidth of channels 3 and 4), and transmit the 40 MHz transmission on both channel 3 and channel 4. Alternatively, the wireless device may transmit a 20 MHz signal on either channel 3 or channel 4. As illustrated in this example, in timeslots 13-15, channels 1-2 are idle, and the respective backoff counters are decremented, while the wireless device continues to transmit on channels 3-4.

In timeslot 15, the backoff counters for channels 1-2 reach 0. Thus, in the next timeslot (i.e., timeslot 16, not shown), the wireless device is free to transmit on any one or more of channels 1-4. Because a legacy system (e.g., a wireless device according to 802.11 standards prior to 802.11ac) maintains only a single backoff counter focused on the primary channel, such a legacy system would have been required to wait until timeslot 16 before transmitting on any channel. Thus, the present method improves efficiency of spectrum use in the example of FIG. 4 by allowing transmission during an additional 9 channel-timeslots, while still maintaining traditional contention rules involving backoff procedures.

As an alternative embodiment to merely providing a separate backoff counter for each frequency band, the wireless device could be further configured to include a separate RF module and a separate baseband module for each frequency band. Each set of RF and baseband modules may be configured to operate in a manner similar to a legacy system, by maintaining a backoff counter for its respective frequency band. In essence, at least with regard to backoff procedures, each set of RF and baseband modules may treat its respective frequency band as a primary frequency band. However, use of multiple RF and baseband modules may result in greater power consumption, which may be undesirable in some applications. Additionally, further modification may be required to integrate the data received via the multiple RF and baseband modules before passing the data over the L3 layer.

Channel Access Rules for Secondary Channels

To allow opportunistic access of secondary channels, while still maintaining backward compatibility, new channel access rules may also, or alternatively, be implemented. For example, a wireless device operating in an 802.11 network may apply rules to prevent conflicts with legacy wireless devices operating according to, e.g., the 802.11a and 802.11n standards, among other standards, if such legacy devices are present in the network.

For example, in some embodiments, a wireless device may transmit in a secondary channel concurrent with another transmission in the primary channel only if the device transmitting on the primary channel belongs to an overlapping basic service set (OBSS); i.e., if the device transmitting on the primary channel does not belong to the same BSS as the wireless device. This may avoid, e.g., multiple wireless devices attempting to transmit to the same AP simultaneously on different channels. In some embodiments, the BSS of the transmission on the primary channel may be determined by determining the BSSID included in the MAC header of the transmission on the primary channel. Alternatively, or additionally, an indication of the BSS may be included elsewhere in the transmission on the primary channel. For example, the PHY preamble of the transmission on the primary channel may include a BSS identifier, e.g., such as the color field defined by 802.11ah.

In some embodiments, a wireless device may be configured to assess the state of all channels before beginning a subsequent transmission. For example, for PPDU transmissions smaller than the AP operating bandwidth, the wireless device may be configured to extend PIFS preceding the start of a transmit opportunity (TXOP) to cover all secondary channels.

In some embodiments a channel access rule may specify that, if an 802.11 legacy wireless device (i.e., a wireless device operating according to an 802.11 standard prior to 802.11ac) is currently transmitting on the primary channel, then the wireless device transmitting on a secondary channel may not transmit beyond the packet length or time durations indicated in the PHY preamble or MAC header of the current transmission on the primary channel. The wireless device transmitting on the secondary channel may determine whether the device transmitting on the primary channel is an 802.11 legacy device based on data in a packet preamble of the current transmission on the primary channel. More generally, this rule may specify that the wireless device transmitting on a secondary channel may not transmit beyond a known transmit duration of a transmission on the primary channel, if the device transmitting on the primary channel is of a type that is not configured to assess the state of all channels before beginning a subsequent transmission. This rule is illustrated by FIG. 5.

Figure 5:
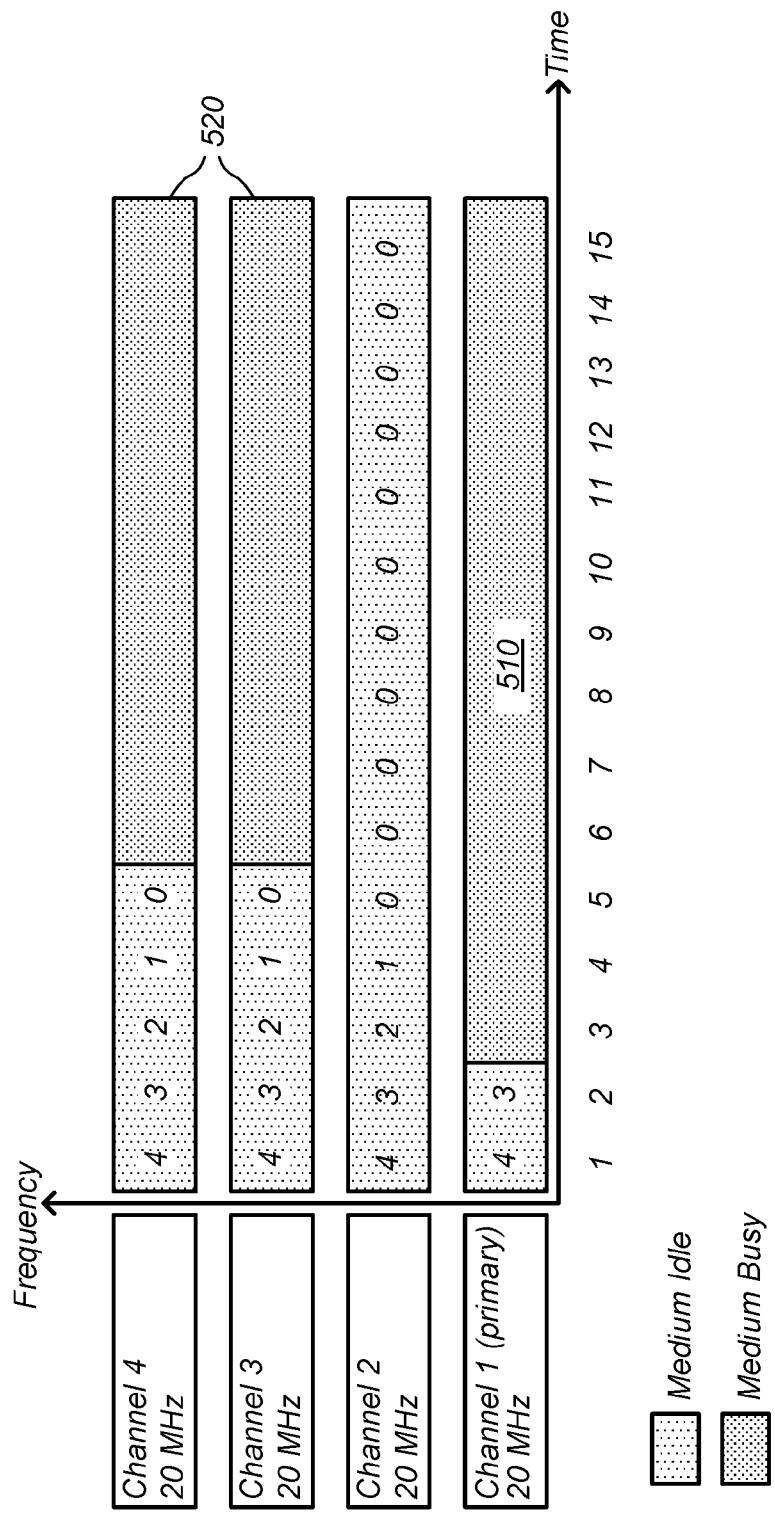
FIG. 5 illustrates an example signal flow of a backoff procedure for transmission by a first wireless device, involving a second wireless device that is not configured to assess the state of all channels before beginning a subsequent transmission, according to some embodiments.

FIG. 5 illustrates an example signal flow of a backoff procedure for transmission by a first wireless device, involving a second wireless device that is not configured to assess the state of all channels before beginning a subsequent transmission, where W=80 MHz and N=4, according to some embodiments. In this example, the first wireless device may have backoff counters initially set to a (e.g., randomly selected) value of 4. In time slots 1 and 2, all four channels are idle, so all four backoff counters are decremented. However, beginning in timeslot 3, the first wireless device may detect that channel 1 (the primary channel) is busy. For example, channel 1 may be occupied by a transmission 510 from the second wireless device, e.g., in an OBSS. Thus, in timeslots 3-5, only the backoff counters for channels 2-4 are decremented.

In response to detecting the transmission 510, the first wireless device may determine that the second wireless device is not configured to assess the state of all channels before beginning a subsequent transmission. For example, the first wireless device may determine that the second wireless device is of a type that is configured to assess only the state of the primary channel, such as a wireless device operating according to an 802.11 standard prior to 802.11ac. The first wireless device may further determine a transmit duration of the transmission 510, e.g., in response to detecting the transmission 510 or in response to determining that the second wireless device is not configured to assess the state of all channels before beginning a subsequent transmission. For example, the first wireless device may determine a packet length or time duration indicated in a PHY preamble or MAC header of the transmission 510.

In timeslot 5 the backoff counters for channels 2-4 reach 0. Thus, in timeslot 6, the first wireless device is free to transmit on those channels. As shown, the first wireless device may transmit a 40 MHz transmission 520 on channels 3 and 4. In response to determining that the second wireless device is not configured to assess the state of all channels before beginning a subsequent transmission, the first wireless device may terminate the transmission 520 at, or prior to, the ending time of the transmission 510. For example, the first wireless device may, prior to beginning the transmission 520, determine a duration of the transmission 520 such that the transmission 520 will terminate at or before the termination of the transmission 510, based on the determined transmit duration of the transmission 510. As shown in FIG. 5, the first wireless device may terminate the transmission 520 at timeslot 15, which is the final timeslot of the transmission 510 in channel 1.

In some embodiments, if an 802.11ac wireless device is currently transmitting on the primary channel, then the wireless device transmitting on a secondary channel may transmit beyond the packet length or time durations indicated in the PHY preamble or MAC header of the current transmission on the primary channel. More generally, this rule may specify that the wireless device transmitting on a secondary channel may transmit beyond a known transmit duration of a transmission on the primary channel, or without regard to a transmit duration of the transmission on the primary channel, if the device transmitting on the primary channel is of a type that is configured to assess the state of all channels before beginning a subsequent transmission. This rule is illustrated by FIG. 6.

Figure 6:
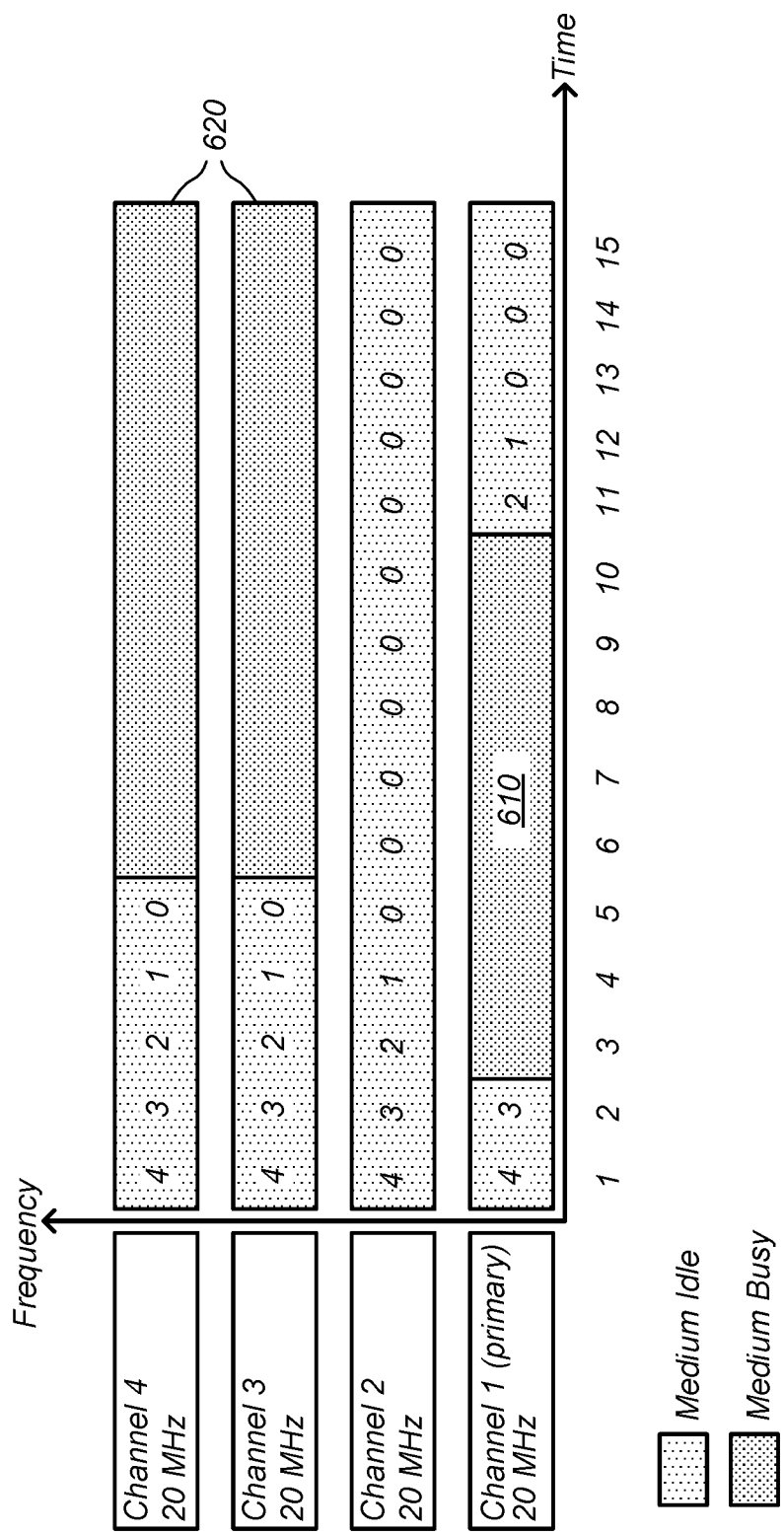
FIG. 6 illustrates an example signal flow of a backoff procedure for transmission by a first wireless device, involving a second wireless device that is configured to assess the state of all channels before beginning a subsequent transmission, according to some embodiments.

FIG. 6 illustrates an example signal flow of a backoff procedure for transmission by a first wireless device, involving a second wireless device that is configured to assess the state of all channels before beginning a subsequent transmission, where W=80 MHz and N=4, according to some embodiments. In this example, the first wireless device may have backoff counters initially set to a (e.g., randomly selected) value of 4. In time slots 1 and 2, all four channels are idle, so all four backoff counters are decremented. However, beginning in timeslot 3, the first wireless device may detect that channel 1 (the primary channel) is busy. For example, channel 1 may be occupied by a transmission 610 from the second wireless device, e.g., in an OBSS. Thus, in timeslots 3-5, only the backoff counters for channels 2-4 are decremented.

In response to detecting the transmission 610, the first wireless device may determine that the second wireless device is configured to assess the state of all channels before beginning a subsequent transmission. For example, the first wireless device may determine that the second wireless device is of a type that is configured to assess the state of all channels before beginning a subsequent transmission, such as a wireless device operating according to 802.11ac. The first wireless device may further determine a length or ending time of the transmission 610, e.g., in response to detecting the transmission 610 or in response to determining that the second wireless device is configured to assess the state of all channels before beginning a subsequent transmission. For example, the first wireless device may determine a packet length or time duration indicated in a PHY preamble or MAC header of the transmission 610.

In timeslot 5 the backoff counters for channels 2-4 reach 0. Thus, in timeslot 6, the first wireless device is free to transmit on those channels. As shown, the first wireless device may transmit a 40 MHz transmission 620 on channels 3 and 4. In response to determining that the second wireless device is of a type that is configured to assess the state of all channels before beginning a subsequent transmission, the first wireless device may continue the transmission 620 beyond the ending time of the transmission 610. For example, the first wireless device may determine a duration of the transmission 620 without regard to a transmit duration of the transmission 610. As shown in FIG. 6, the first wireless device may continue the transmission 620 beyond timeslot 10, which is the final timeslot of the transmission 610 in channel 1. In the scenario shown in FIG. 6, at timeslot 13, the backoff counter for channel 1 reaches 0, so the first wireless device is free to transmit on all channels.

As previously stated, in the scenario of FIG. 6, the second wireless device is configured to assess the state of all channels before beginning a subsequent transmission. Thus, if the second wireless device desires to begin a new transmission during any of timeslots 11-15, it will determine that channels 3 and 4 are occupied by the transmission 620. The second wireless device may therefore be unable to use channels 3 or 4 until they become unoccupied. For example, the second wireless device may be limited to transmitting only on channel 1 and/or channel 2 (i.e., a 20 MHz or 40 MHz transmission) until additional channels have been idle for at least PIFS.

In some embodiments, a slotted channel access scheme may be used, wherein time windows may be defined for transmission by specified wireless devices, and wherein transmissions on the primary channel are constrained to begin at the start of a time window. In such embodiments, if the wireless device specified for transmission during a given time window does not transmit on one or more of the secondary channels, then another wireless device may transmit on those secondary channels during the time window, according to any of the preceding embodiments. In such embodiments, transmission on the secondary channels may continue until the end of the time window, regardless of whether the device transmitting on the primary channel is of a type that is configured to assess the state of all channels before beginning a subsequent transmission, because no subsequent transmission will begin on the primary channel until the start of the next time window. This is illustrated in FIG. 7.

Figure 7:
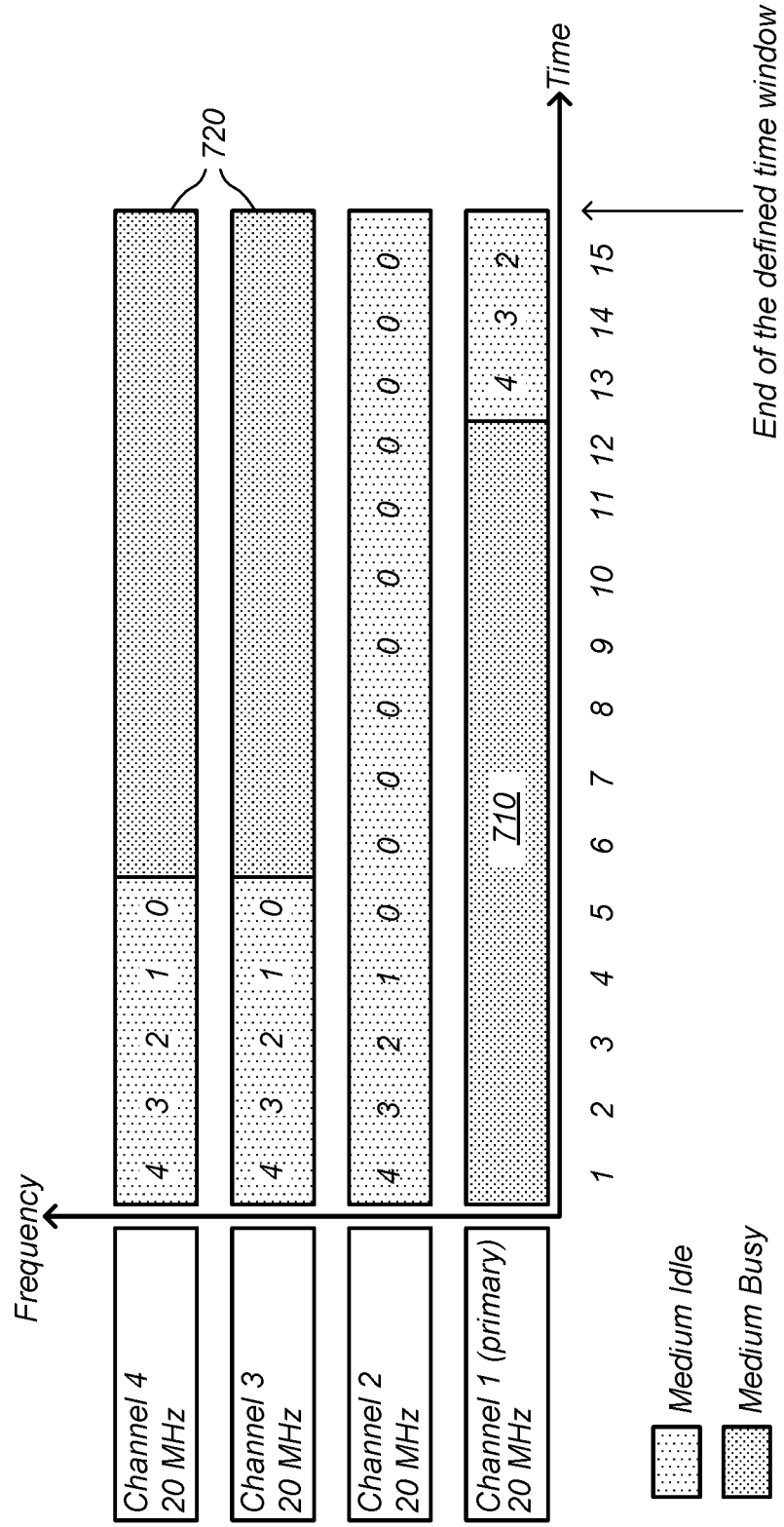
FIG. 7 illustrates an example signal flow of a backoff procedure for transmission by a first wireless device, in which a time window is defined for transmission by a second wireless device, according to some embodiments.

FIG. 7 illustrates an example signal flow of a backoff procedure for transmission by a first wireless device, in which a time window is defined for transmission by a second wireless device, where W=80 MHz and N=4, according to some embodiments. In this example, timeslots 1-15 represent at least a portion of the time window defined for transmission by the second wireless device, the time window ending at the conclusion of timeslot 15. For example, the time window may be a slot within a restricted access window (RAW), as defined by 802.11ah. The first wireless device may have backoff counters initially set to a (e.g., randomly selected) value of 4. In time slots 1-5, channels 2-4 are idle, so the associated backoff counters are decremented. However, the first wireless device may detect that channel 1 (the primary channel) is busy. For example, channel 1 may be occupied by a transmission 710 from a second wireless device, e.g., in an OBSS. Alternatively, in some embodiments, the first wireless device may not determine whether channel 1 is busy during the time window, because the first channel is assumed to be occupied by the second wireless device during that time.

In timeslot 5 the backoff counters for channels 2-4 reach 0. Thus, in timeslot 6, the first wireless device is free to transmit on those channels. As shown, the first wireless device may transmit a 40 MHz transmission 720 on channels 3 and 4. Because transmissions on the primary channel are constrained to begin at the start of a time window, the first wireless device may continue the transmission 720 beyond the ending time of the transmission 710. Specifically, the first wireless device may continue the transmission 720 for any duration up to the end of the time window, without consideration of whether the transmission 710 has terminated on channel 1. For example, as shown in FIG. 7, the first wireless device may continue the transmission 720 through timeslot 15, despite transmission 710 having terminated at timeslot 12.

It should be understood that the details of the preceding examples, such as the operating bandwidth W, number of frequency bands N, time durations, backoff counter values, etc., are only examples. It should also be understood that each of the first wireless device and the second wireless device in the preceding examples may be or include a mobile device, such as the mobile device 106, or an access point, such as the access point 112, or any other wireless device configured to perform the procedures described.

Figure 8:
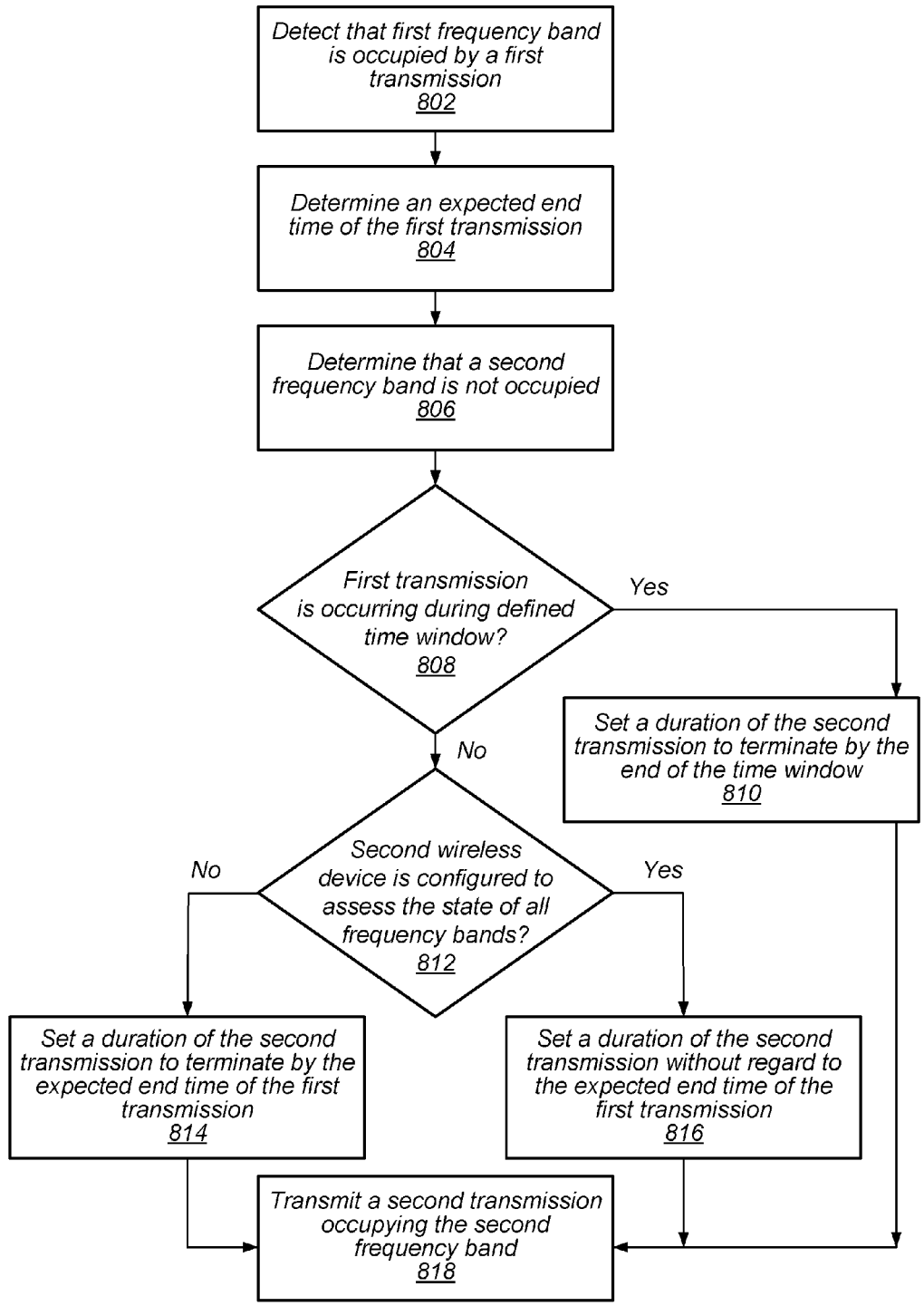
FIG. 8 is a flowchart diagram illustrating an example method of utilizing available secondary channels, according to some embodiments.

FIG. 8—Method of Performing Concurrent Transmissions

FIG. 8 is a flowchart diagram illustrating an example method of utilizing available secondary channels, according to some embodiments. The method shown in FIG. 8 may be used in conjunction with any of the systems or devices shown in the above Figures, among other devices. For example, the method may be performed by a client station, such as the mobile device 106. In various embodiments, some of the method elements shown may be performed concurrently, in a different order than shown, or may be omitted. Note also that additional method elements may also be performed as desired. The method may be performed as follows.

As shown, in 802, the mobile device 106 may detect that a first frequency band within an operating bandwidth of a wireless network is occupied by a first transmission transmitted by a second wireless device. For example, the second wireless device may be a second client station or an AP. The first frequency band may be a primary channel. In some scenarios, the mobile device 106 may further determine that the second wireless device belongs to a different basic service set (BSS) than the mobile device 106. The method may be terminated if the second wireless device does not belong to a different BSS.

In 804, the mobile device 106 may determine an expected end time of the first transmission.

In 806, the mobile device 106 may determine that at least one other frequency band within the operating bandwidth of the wireless network (e.g., at least one secondary channel) is not occupied. For example, the mobile device 106 may determine that a second frequency band within the operating bandwidth of the wireless network is not occupied by the first transmission and/or any other transmission. In some scenarios, the mobile device 106 may maintain a plurality of backoff counters for a respective plurality of frequency bands within the operating bandwidth of the wireless network. In such scenarios, the mobile device 106 may consider a frequency band to be unoccupied only if the respective backoff counter has expired.

In response to determining that the second frequency band within the operating bandwidth of the wireless network is not occupied in 806, the mobile device 106 may transmit a second transmission on the unoccupied second frequency band, as discussed at step 818 below.

In 808, the mobile device 106 may determine whether the first transmission is occurring during a time window defined for transmission by the second wireless device, such as in a slotted channel access scheme. If the first transmission is occurring during a time window defined for transmission by the second wireless device, then, in 810, the mobile device 106 may set a duration of the second transmission such that the second transmission will terminate not later than an end of the time window. Otherwise, the mobile device 106 may proceed to step 812.

In 812, the mobile device 106 may determine whether the second wireless device is configured to assess the state of all frequency bands within the operating bandwidth before beginning a subsequent transmission. Specifically, the mobile device 106 may determine whether the second wireless device is configured to determine whether each frequency band within the operating bandwidth is occupied. If the second wireless device is not configured to assess the state of all frequency bands within the operating bandwidth before beginning a subsequent transmission, then in 814, the mobile device 106 may set a duration of the second transmission such that the second transmission will terminate not later than the expected end time of the first transmission. Alternatively, if the second wireless device is configured to assess the state of all frequency bands within the operating bandwidth before beginning a subsequent transmission, then in 816, the mobile device 106 may set the duration of the second transmission without regard to the expected end time of the first transmission.

In 818, in response to determining that the second frequency band within the operating bandwidth of the wireless network is not occupied in 806, the mobile device 106 may transmit the second transmission on the unoccupied second frequency band. The second transmission may have the duration set in 810, 814, or 816.

As noted above, some of the method elements shown may be omitted. For example, in some scenarios, steps 808 and 810 may be omitted. In other scenarios, steps 812, 814, and 816 may be omitted. Also, some of the method elements shown may be performed in a different order than shown. For example, the expected end time of the first transmission may be determined at step 804 at another point in the method, such as in response to determining that the second wireless device is not configured to assess the state of all frequency bands within the operating bandwidth before beginning a subsequent transmission at step 812. As another example, steps 802, 804, 808, and 812 may occur in a different order and/or substantially concurrently, e.g., when the mobile device 106 detects a preamble of the first transmission.

Figure 9:
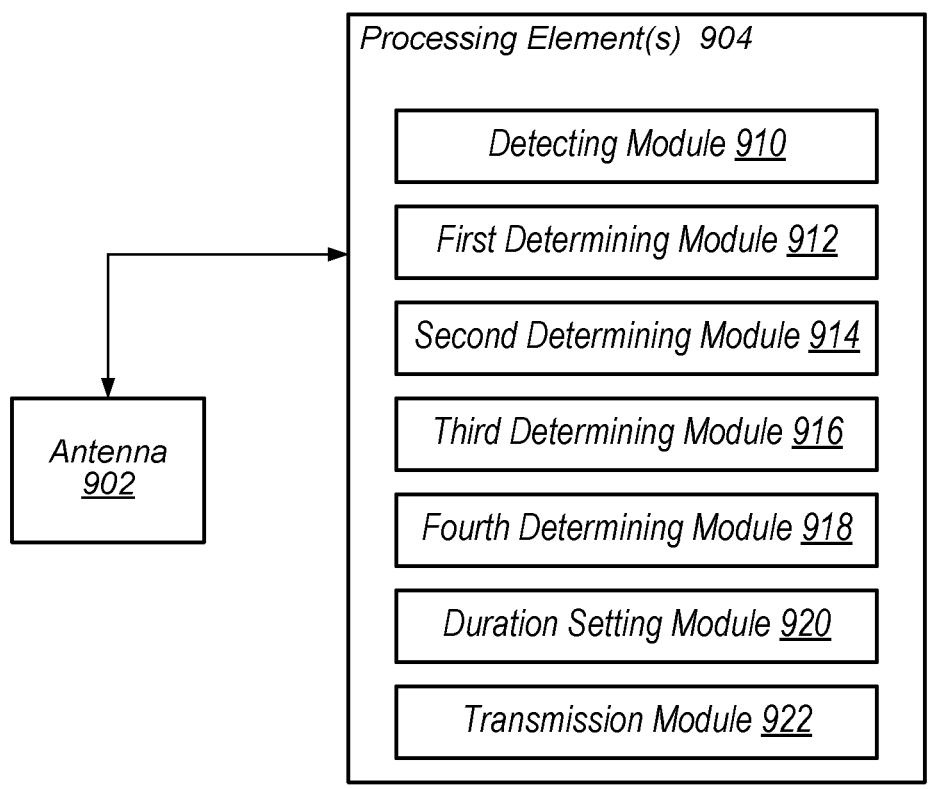
FIG. 9 illustrates a processing element including modules for utilizing available secondary channels, according to some embodiments.

FIG. 9—Processing Element for Performing Concurrent Transmissions

FIG. 9 illustrates a processing element including modules for utilizing available secondary channels, according to some embodiments. In some embodiments, antenna 902 may be coupled to processing element 904. The processing element 904 may be configured to perform the method described above in reference to FIG. 8. In some embodiments, processing element 904 may include one or more modules, such as modules (or circuitry) 910-922, and the modules (or circuitry) may be configured to perform various steps of the method described above in reference to FIG. 8. In some embodiments, the processing element may be included in a first wireless device, such as the mobile device 106. In other embodiments, the processing element may be included in an AP, such as the AP 112. As shown, the modules may be configured as follows.

In some embodiments, processing element 904 may include a detecting module 910 configured to detect that a first frequency band within an operating bandwidth of a wireless network is occupied by a first transmission transmitted by a second wireless device. For example, the second wireless device may be a second client station or an AP. The first frequency band may be a primary channel.

In some embodiments, processing element 904 may include a first determining module 912 configured to determine an expected end time of the first transmission. In some scenarios, the first determining module 912 may be further configured to determine that the second wireless device belongs to a different basic service set (BSS) than the processing element 904.

In some embodiments, processing element 904 may include a second determining module 914 configured to determine that at least one other frequency band within the operating bandwidth of the wireless network (e.g., at least one secondary channel) is not occupied. For example, the second determining module 914 may be configured to determine that a second frequency band within the operating bandwidth of the wireless network is not occupied by the first transmission and/or any other transmission. In some scenarios, the second determining module 914 may be configured to maintain a plurality of backoff counters for a respective plurality of frequency bands within the operating bandwidth of the wireless network. In such scenarios, the second determining module 914 may be configured to consider a frequency band to be unoccupied only if the respective backoff counter has expired.

In some embodiments, processing element 904 may include a third determining module 916 configured to determine whether the first transmission is occurring during a time window defined for transmission by the second wireless device, such as in a slotted channel access scheme.

In some embodiments, processing element 904 may include a fourth determining module 918 configured to determine whether the second wireless device is configured to assess the state of all frequency bands within the operating bandwidth before beginning a subsequent transmission. Specifically, the fourth determining module 918 may be configured to determine whether the second wireless device is configured to determine whether each frequency band within the operating bandwidth is occupied.

In some embodiments, processing element 904 may include a duration setting module 920 configured to set a duration of a second transmission to be generated by the processing element 904. In some embodiments, the duration setting module 920 may be configured to set the duration of the second transmission such that the second transmission will terminate not later than an end of the time window in response to the third determining module 916 determining that the first transmission is occurring during a time window defined for transmission by the second wireless device. In some embodiments, the duration setting module 920 may be configured to set the duration of the second transmission such that the second transmission will terminate not later than the expected end time of the first transmission, in response to the fourth determining module 918 determining that the second wireless device is not configured to assess the state of all frequency bands within the operating bandwidth before beginning a subsequent transmission. In some embodiments, the duration setting module 920 may be configured to set the duration of the second transmission without regard to the expected end time of the first transmission, in response to the fourth determining module 918 determining that the second wireless device is configured to assess the state of all frequency bands within the operating bandwidth before beginning a subsequent transmission.

In some embodiments, processing element 904 may include a transmission module 922 configured to generate the second transmission on the unoccupied second frequency band. In some embodiments, the transmission module 922 may be configured to generate the second transmission having the duration set by the duration setting module 920. In some embodiments, the transmission module 922 may be configured to generate the second transmission in response to the second determining module 914 determining that the at least one other frequency band within the operating bandwidth of the wireless network is not occupied.

It is apparent for those skilled in the art that, for the particular processes of the modules (or circuitry) described above (such as modules 910-922), reference may be made to the corresponding steps (such as steps 802-818) in the related process embodiment sharing the same concept and the reference is regarded as the disclosure of the related modules (or circuitry) as well. Furthermore, processing element 904 may be implemented in software, hardware or combination thereof. More specifically, processing element 904 may be implemented as circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors. Additionally, processing element 904 may be implemented as a general-purpose processor such as a CPU, and therefore each module can be implemented with the CPU executing instructions stored in a memory which perform a respective step.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a wireless device may be configured to include a processor (or a set of processors) and a memory medium, where the memory medium stores program instructions, where the processor is configured to read and execute the program instructions from the memory medium, where the program instructions are executable to cause the wireless device to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A mobile device, comprising:
   a radio configured to perform wireless communication within a wireless network;
   at least one processor coupled to the radio, wherein the at least one processor is configured to cause the mobile device to:
   detect, via the radio, a first transmission occupying a first frequency band within an operating bandwidth of the wireless network, wherein the first transmission is transmitted by a remote wireless device, the first transmission occurring during a time window defined for transmission by the remote wireless device, wherein the end of the time window is scheduled to occur later than a scheduled end time of the first transmission;

in response to a determination that the first transmission does not occupy a second, different frequency band within the operating bandwidth of the wireless network, transmit, via the radio, a second transmission occupying the second frequency band concurrent with the first transmission; and set a duration of the second transmission such that the second transmission will terminate not later than the scheduled end of the time window.

2. The mobile device of claim 1, wherein, in setting the duration of the second transmission, the at least one processor is further configured to cause the mobile device to:

determine the scheduled end time of the first transmission; and in response to determining that the remote wireless device is not configured to assess the state of all frequency bands within the operating bandwidth before beginning a subsequent transmission, set the duration of the second transmission such that the second transmission will terminate not later than the scheduled end time of the first transmission.

3. The mobile device of claim 2, wherein, in setting the duration of the second transmission, the at least one processor is further configured to cause the mobile device to:

in response to determining that the remote wireless device is configured to assess the state of all frequency bands within the operating bandwidth before beginning a subsequent transmission, set the duration of the second transmission without regard to the scheduled end time of the first transmission.

4. The mobile device of claim 1, wherein the at least one processor is further configured to cause the mobile device to:

determine whether the remote wireless device comprises an IEEE 802.11 legacy wireless device;

in response to determining that the remote wireless device comprises an IEEE 802.11 legacy wireless device, set the duration of the second transmission such that the second transmission will terminate not later than the scheduled end time of the first transmission; and in response to determining that the remote wireless device does not comprise an IEEE 802.11 legacy wireless device, set the duration of the second transmission without regard to the scheduled end time of the first transmission.

5. The mobile device of claim 4, wherein
setting the duration of the second transmission such that the second transmission will terminate not later than the scheduled end of the time window is in response to the determining that the remote wireless device does not comprise an IEEE 802.11 legacy wireless device, and further in response to a determination that the first transmission is occurring during the time window defined for transmission by the remote wireless device.

6. The mobile device of claim 1, wherein the at least one processor is further configured to cause the mobile device to:

maintain a plurality of backoff counters for a respective plurality of frequency bands within the operating bandwidth of the wireless network, wherein the plurality of backoff counters comprises a first backoff counter for the first frequency band and a second backoff counter for the second frequency band;

wherein transmitting the second transmission is in response to determining that the second backoff counter has expired and the first backoff counter has not expired.

7. The mobile device of claim 1, wherein the at least one processor is further configured to cause the mobile device to:

determine that the remote wireless device belongs to a different basic service set (BSS) than the mobile device, wherein transmitting the second transmission is further in response to the determining that the remote wireless device belongs to a different BSS.

8. A non-transitory computer-readable medium storing software instructions executable by a processor of a first wireless device to cause the first wireless device to:

detect that a first frequency band within an operating bandwidth of a wireless network is occupied by a first transmission transmitted by a second wireless device, the first transmission occurring during a time window defined for transmission by the second wireless device, wherein the end of the time window is scheduled to occur later than a scheduled end time of the first transmission;

in response to a determination that a second, different frequency band within the operating bandwidth of the wireless network is not occupied, transmit a second transmission occupying the second frequency band concurrent with the first transmission; and set a duration of the second transmission such that the second transmission will terminate not later than the scheduled end of the time window.

9. The non-transitory computer-readable medium of claim 8, wherein, in setting the duration of the second transmission, the instructions are further executable to cause the first wireless device to:

determine the scheduled end time of the first transmission; and in response to determining that the second wireless device is not configured to assess the state of all frequency bands within the operating bandwidth before beginning a subsequent transmission, set the duration of the second transmission such that the second transmission will terminate not later than the scheduled end time of the first transmission.

10. The non-transitory computer-readable medium of claim 9, wherein, in setting the duration of the second transmission, the instructions are further executable to cause the first wireless device to:

in response to determining that the second wireless device is configured to assess the state of all frequency bands within the operating bandwidth before beginning a subsequent transmission:

set the duration of the second transmission without regard to the scheduled end time of the first transmission.

11. The non-transitory computer-readable medium of claim 8, wherein the instructions are further executable to cause the first wireless device to:

determine whether the second wireless device comprises an IEEE 802.11 legacy wireless device;

in response to the determining that the second wireless device comprises an IEEE 802.11 legacy wireless device, set the duration of the second transmission such that the second transmission will terminate not later than the scheduled end time of the first transmission; and in response to the determining that the second wireless device does not comprise an IEEE 802.11 legacy wireless device, set the duration of the second transmission without regard to the scheduled end time of the first transmission.

12. The non-transitory computer-readable medium of claim 11, wherein
setting the duration of the second transmission such that the second transmission will terminate not later than the scheduled end of the time window is in response to the determining that the second wireless device does not comprise an IEEE 802.11 legacy wireless device, and further in response to a determination that the first transmission is occurring during a time window defined for transmission by the second wireless device.

13. The non-transitory computer-readable medium of claim 8, wherein the instructions are further executable to cause the first wireless device to:
maintain a plurality of backoff counters for a respective plurality of frequency bands within the operating bandwidth of the wireless network, wherein the plurality of backoff counters comprises a first backoff counter for the first frequency band and a second backoff counter for the second frequency band;
wherein transmitting the second transmission is in response to determining that the second backoff counter has expired and the first backoff counter has not expired.

14. The non-transitory computer-readable medium of claim 8, wherein the instructions are further executable to cause the first wireless device to:
determine that the second wireless device belongs to a different basic service set (BSS) than the first wireless device, wherein transmitting the second transmission is further in response to the determining that the second wireless device belongs to a different BSS.

15. A method for communicating within a wireless network, the method comprising:
by a first wireless device:
detecting a first transmission by a second wireless device during a time window defined for transmission by the second wireless device, the first transmission occupying a first frequency band within an operating bandwidth of the wireless network, wherein the end of the time window is scheduled to occur later than a scheduled end time of the first transmission;
in response to a determination that the first transmission does not occupy a second, different frequency band within the operating bandwidth of the wireless network, transmitting a second transmission occupying the second frequency band concurrent with the first transmission; and
setting a duration of the second transmission such that the second transmission will terminate not later than the scheduled end of the time window.

16. The method of claim 15, further comprising setting the duration of the second transmission without regard to the scheduled end time of the first transmission.

17. The method of claim 15, further comprising:
maintaining a plurality of backoff counters for a respective plurality of frequency bands within the operating bandwidth of the wireless network, wherein the plurality of backoff counters comprises a first backoff counter for the second frequency band;
wherein transmitting the second transmission is in response to determining that the first backoff counter has expired.

18. The method of claim 15, further comprising:
determining that the second wireless device belongs to a different basic service set (BSS) than the first wireless device, wherein transmitting the second transmission is further in response to the determining that the second wireless device belongs to a different BSS.

19. The method of claim 15, wherein the scheduled end time of the first transmission is specified in a packet header of the first transmission.

* * * * *